Figure 4:
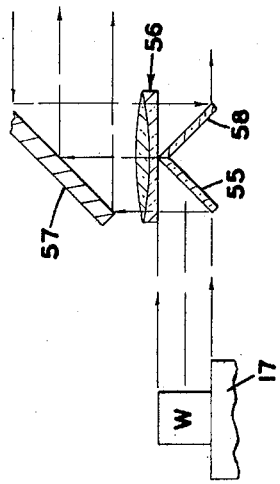

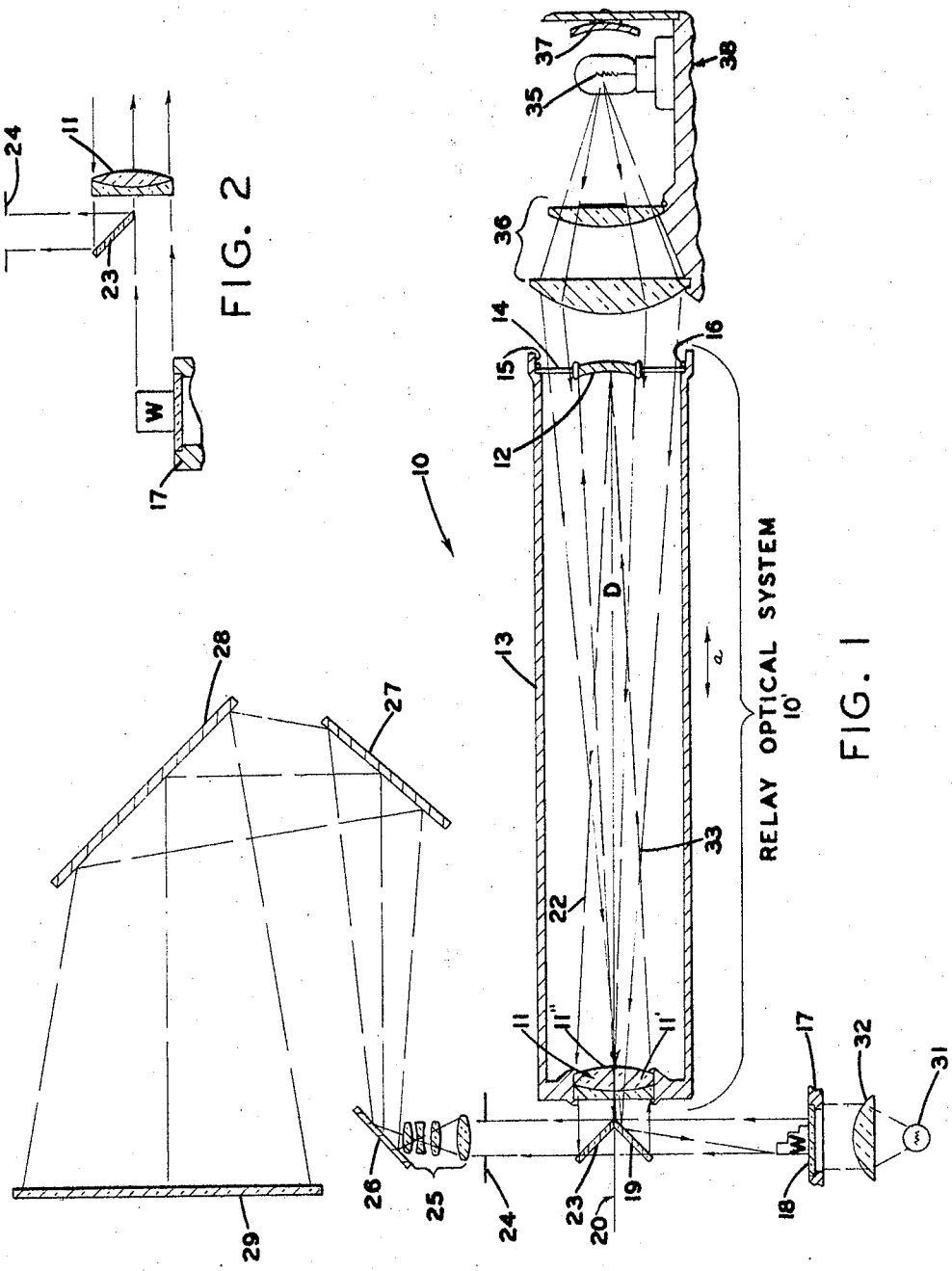

March 1, 1966  R. M. ALTMAN  3,237,515
AFOCAL TELECENTRIC CATODIOPTRIC OPTICAL SYSTEM
FOR MEASURING INSTRUMENTS Filed April 16, 1963  3 Sheets-Sheet 2

INVENTOR.
RICHARD M. ALTMAN
BY Frank C. Parker
ATTORNEY

INVENTOR.
RICHARD M. ALTMAN

United States Patent Office 3,237,515
Patented Mar. 1, 1966

3,237,515
AFOCAL TELECENTRIC CATADIOPTRIC OPTICAL SYSTEM FOR MEASURING INSTRUMENTS
Richard M. Altman, Brighton, N.Y., assignor to Bausch & Lomb Incorporated, Rochester, N.Y., a corporation of New York
Filed Apr. 16, 1963, Ser. No. 273,400
6 Claims. (Cl. 88—24)

This application is a continuation-in-part of my prior application Ser. No. 138,983, now abandoned, filed September 18, 1961.

The present invention relates to a catadioptric optical system which is afocal and telecentric and more particularly relates to such a system for use in precision optical projectors such as optical measuring instruments, contour projectors, continuous motion film printers and kindred devices.

This invention is particularly advantageous when used in contour projectors and the like and such a device is described hereinafter.

It is an object of the present invention to provide an optical system for a measuring instrument or other optical device wherein the image must be free of distortion, such as contour projectors or the aforementioned continuous motion film printer and the like, said system being afocal and telecentric and so as to form an image of nominal unity magnification wherein the chromatic and monochromatic image aberrations as well as coma and astigmatism are well corrected within very close limits and wherein these desirable results can be obtained in spite of disparity in the equality of the conjugates of the optical system.

A further object is to provide an optical system which is constructed as a folded beam or catadioptric system having a lens and an optically aligned mirror so as to reduce the over-all dimensions of the system to a minimum, the system being so constructed and arranged as to produce a flat field of superior quality along with substantially perfect correction of distortion whereby a coherent magnification for all parts of the image is obtained.

A still further object of this invention is to provide such an optical system wherein a positive lens is used in combination with a concave mirror to form the image, the image rays which pass through the lens toward the mirror occupying a maximum of half of the lens aperture and the rays which are reflected from the mirror occupying the other half of the lens aperture, so that the optical system in effect is perfectly symmetrical in form and the magnification factor for all points in the image is the same and does not need focal compensation mechanism of any kind which is required for two separate lenses as shown in the prior art.

Another object is to provide such an optical system having the Petzval sum of its lens opposite in sign to the Petzval sum of the mirror and having relative values which are required to satisfactorily flatten the field, said mirror serving as the aperture stop of the system as a second function.

A further object of this invention is to provide such a device having illumination mechanism for the object comparable to the vertical illumination mechanism of known microscopes and having the same advantages of even light distribution and satisfactory intensity.

Figure 3:
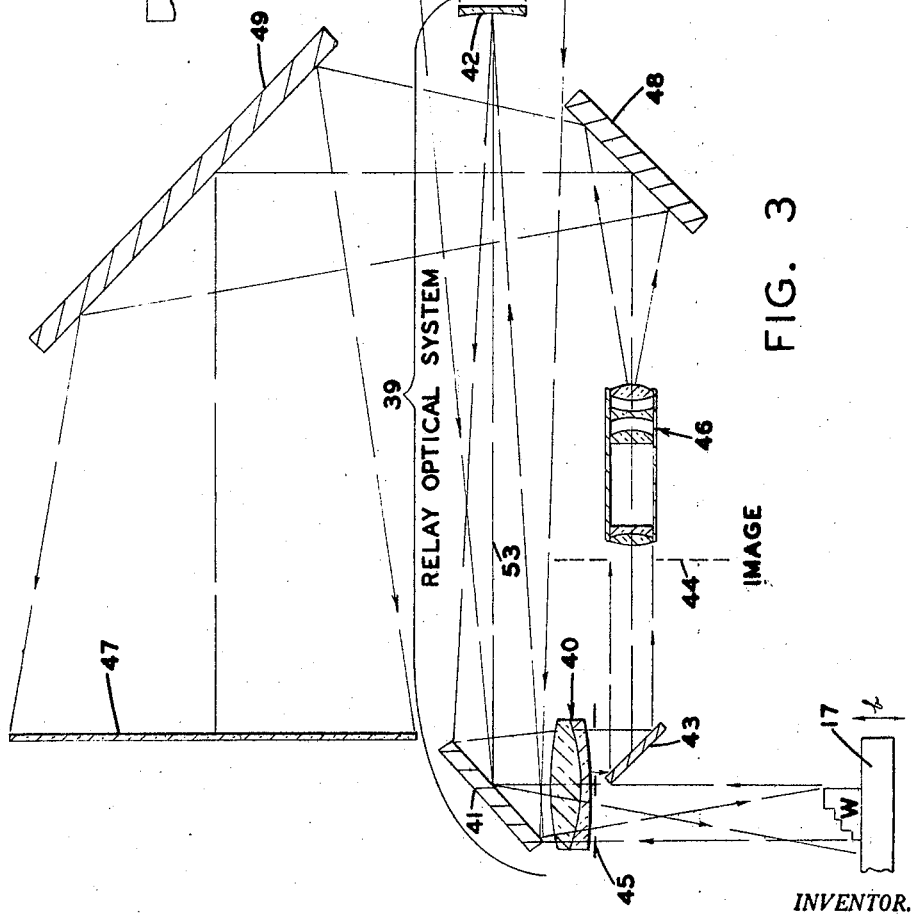
Figure 5:
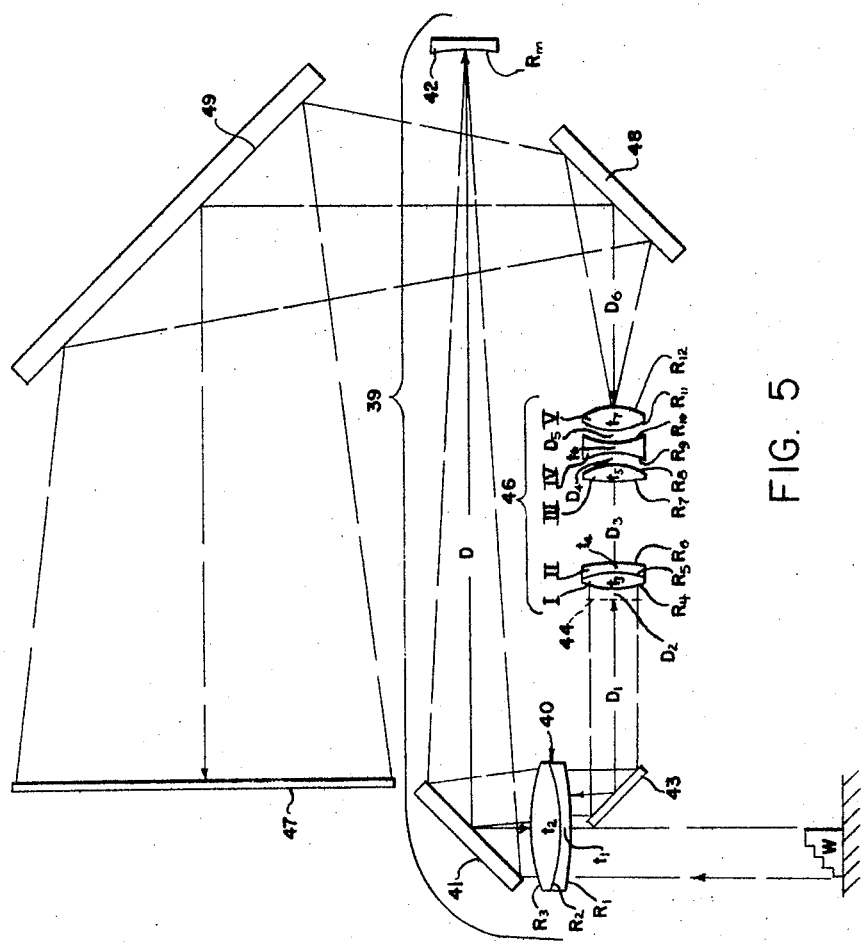

Further objects and advantages will be apparent in the combination and construction of the parts of the optical system from the specification herebelow taken in conjunction with the accompanying drawings, wherein:

FIG. 1 is a schematic drawing of one preferred form of the present invention, parts thereof being shown in section or broken away, FIG. 2 is an optical diagram of a modification of the object end of the optical system shown in FIG. 1, FIG. 3 is an optical schematic drawing similar to FIG. 1 of a second form of the present invention, parts thereof being shown in section or broken away, FIG. 4 is an optical diagram of a still further modification of the object end of the optical system shown in FIG. 3, and FIG. 5 is an optical diagram of certian optical details similar to FIG. 3.

According to one preferred form of this invention as shown in FIG. 1, an optical system for a measuring instrument such as a contour projector is generally represented by the numeral 10, and included therein is a relay optical system 10' which constitutes an outstanding part of said projector, said relay system basically comprising the combination of a positive lens 11 and a concave positive mirror 12. These two optical members 11 and 12 are optically aligned with respect to each other and are spaced apart by a distance D which is substantially equal to the infinity focus of the positive lens 11.

This combination of optical elements is in effect a folded beam optical relay system 10' having an advantageous short over-all length. A distinctive feature of said system 10' is that the refracting area of the positive lens 11 is functionally divided into two equal and opposite parts and the object to be projected is optically aligned with one of these parts 11' in an "off axis" position with reference to the common axis 20 on which the lens 11 and mirror 12 are centered. From such a position the image rays are projected obliquely by the lens onto the mirror 12 from whence the rays are directed through the other part 11" of said lens 11 to an image position which is located on the same side of the lens as the object and is conjugate thereto. The two aforesaid optical members 11 and 12 are preferably united by a longitudinally rigid frame 13 wherein both members are suitably secured, the rearmost member (mirror 12) being secured in a spider-like carrier member 14 which alternatively may be constructed as a glass disc to replace the member 14. Said mirror carrier member 14 is secured around its periphery within a counterbore 15 within the frame 13 in any preferred manner such as a retaining ring 16.

As above described, the principal rays pass through corresponding parts of the lens 11 in opposite directions in forming said image and therefore in effect the optical system is symmetrical and substantially free from distortion. Exactly corresponding opposite parts of the lens are used for refraction of the image rays in both directions which results in great accuracy in maintaining a constant point-to-point magnification factor in the entire image.

An extremely flat field is provided by the relay optical system 10' by reason of the fact that the Petzval sum of the lens 11 is opposite in sign to the Petzval sum of the mirror 12, the relative values thereof being adjusted for optimum compensation.

Forwardly of the optical system an object such as a workpiece W is held on a movable platform or stage 17 which is only partially shown in FIG. 1. Said stage has an aperture therein over which a clear glass plate 18 is secured whereon the workpiece W rests during normal operations. Between the workpiece W and the lens 11 an inclined mirror 19 is arranged with its upper boundary substantially coincident with the axis 20 of the relay optical system. This arrangement serves two purposes such that primarily, mirror 19 may operate like a diaphragm to divide the effective lens aperture of lens 11 substantially in half and secondly, it directs the illumination rays emanating from the light source toward the workpiece W. After passing therethrough the image rays are reflected by the concave surface of the mirror 12. Return rays 22 are reflected from the mirror 12 at the same angle as the incident rays and are refracted by the lens 11 and immediately behind the lens 11 is arranged a second inclined mirror 23 which preferably lies contiguous to mirror 19 and serves to deflect the image rays 22 vertically to an image position which is indicated by the diaphragm 24. Furthermore, the construction and arrangement of the inclined mirror 19 permits the relay optical system 10' to lie horizontally in the projector wherein it is mounted, thus requiring less vertical space and serving to further consolidate the interior parts of said projector.

Focused at diaphragm 24 is an objective 25 of telecentric optical form which is constructed and arranged so as to transmit and magnify the image formed at the diaphragm 24 without deleterious distortion. For this purpose are provided three plane mirrors 26, 27 and 28 which deflect the image rays during magnification of the image as it is projected upon a screen 29.

For diascopic illumination of the object or workpiece W, a light source in the form of a lamp 31 is provided, the light from which is suitably collimated by a condenser lens 32 and which is projected through the glass plate 18 so as to produce a silhouette image of the workpiece at diaphragm 24. Said image is formed by the image rays 33 which are reflected by the concave mirror 12 and are projected backwardly therefrom through the lens 11 where the rays are deflected by the mirror 23 to form the aforesaid silhouette image.

For episcopic illumination, a lamp 35 is provided having aligned therewith a condenser lens 36 and a reflector 37, all of these members being united in a lamp housing which is fragmentarily shown at 38. Preferably, the lamp house 38 is constructed independently of the frame 13 so that the lamp house is stationary or separately movable.

Referring more particularly to the means for diaphragming the optical relay system 10' in such a way that the maximum of only half of the effective aperture of lens 11 is used for transmitting image rays in any single direction, the diaphragm means may be provided by an apertured plate or an axially directed septum, not shown, which may lie adjacent to the lens 11 and when so used in some forms of the invention, this diaphragm serves as an additional diaphragming means auxiliary to the diaphragming provided by the mirrors 19 and 23.

Referring to FIG. 2 of the drawing, the modification there shown is similar in many respects to FIG. 1 and similar parts are similarly numbered. Therefore, the workpiece W or object which rests upon the stage 17 is imaged by the lens 11 forwardly of said lens at the diaphragm 24, the return image rays from the concave mirror which traverse the lens 11 being deflected by the mirror 23 to the image plane which is located at said diaphragm 24. The workpiecce W is placed differently from FIG. 1, since it is located directly in front of lens 11 and below its optical axis 20.

FIG. 3 of the drawing represents a second form of this invention having a relay optical system 39 similar to the aforesaid optical system 10'. According to this form of the invention, the relay system 39 comprises a positive lens 40 which is arranged over a workpiece W which has a face positioned within the depth of focus of the relay system. Over the lens 40 and optically aligned therewith is provided an oblique plane mirror 41 which covers the entire lens aperture and deflects the image rays from half of the positive lens 40 toward a concave mirror 42, similar to the mirror 12 disclosed in FIG. 1. Said mirror 42 is spaced at the focal point of the lens 40 when it receives collimated light and is optically aligned therewith.

Image rays which are reflected from concave mirror 42 are directed reversely to again be intercepted by plane mirror 41 and from thence downwardly through the lens 40.

Below the lens 40 is arranged an inclined plane mirror 43 which covers only half of the free aperture of the lens 40 and thereby serves two purposes which are: (a) To fold of deflect the ray bundle laterally for the purpose of reducing the over-all dimensions of the optical system, and (b) to act as a diaphragm or occluder to limit the incoming rays from the workpiece to half of the effective free aperture of the lens 40 and to also reflect only the return rays which are refracted by the opposite half of the free aperture of said lens. System 39 forms an image 44 after the image rays are deflected from mirror 43.

Lens systems of the kind above described may advantageously provide additional and separate lens diaphragms such as shown at 45 near the lens 40 or otherwise located so that the placement of mirrors partially across the lens aperture need not necessarily constitute the sole diaphragming means as aforesaid.

The optical system here described is so designed and arranged that the concave mirror 42 has additional functions which are to act as the aperture stop for the relay system 39.

Rearwardly and optically aligned with the image 44 there is provided an objective 46 of telecentric optical form, this objective being provided for enlarging the image formed at 44 without deleterious distortion. Said enlarged image is projected thereby upon a screen 47 by means of two inclined mirrors 48 and 49 which are optically aligned therewith and constitute a part of the projector optical system.

For illuminating the object piece W episcopically, there is provided a light source 50 which is a part of a lamphouse, not shown, and is assembled upon a mounting member 51 in optical alignment with a condenser lens 52 which is approximately concentrically positioned with regard to the concave mirror 42.

Light from the light source 50 coming through the condenser 52 is distributed and projected around the mirror 42 and is so downwardly directed as to impinge the unoccluded part of the bundle of light below the central axis 53 of the projection system on the mirror 41 and therefrom the rays are projected downwardly through the lens 40 to illuminate the workpiece W with substantially vertical illumination.

The sub frame 51 may be mounted for proper focusing movement in the projector so as to provide a proper lighting condition on the workpiece W. Also, the stage 17 may be mounted by any desired mechanism for vertical movement in the direction of the arrow b, to accomplish focusing of said image upon the screen 47. Alternatively, the entire relay optical system 39 per se may be raised and lowered for focusing while the workpiece is held stationary.

In FIG. 4 of the drawing, a second modification of the optical system is shown wherein the image rays coming horizontally from the workpiece W are deflected by an oblique mirror 55 upwardly through a positive projection lens 56 so as to impinge upon an oblique plane mirror 57 located thereabove. Image rays which return from the concave reflector, not shown, to the mirror 57 are deflected downwardly through the lens 56 so as to impinge upon an inclined mirror 58 located therebelow whereat the rays are deflected laterally toward a magnifying objective, not shown, for enlargement of the image.

It will be noticed that said mirrors 55 and 57 not only serve to deflect the image rays laterally but also function as diaphragming means for the optical system whereby the positive lens 56 is used twice during the projection of rays from the object to the screen.

Regarding the aforementioned use of the above-described relay optical system 10' in a continuous motion film printing mechanism, not shown, the construction may be visualized in FIG. 1 by locating the film to be copied in the plane of the workpiece W and by substituting the image receiving film at the diaphragm 24 in place of the objective 25.

As aforesaid, the primary advantage of the above-described optical system in a critical measuring instrument is the double use of the relay lens 11 or 40 for refracting the image rays which in effect provides a perfectly symmetrical system in which the point-to-point magnification of the image is exactly maintained. This feature is extremely important for critical measuring and is achieved very simply and economically without adding compensation means.

It is further pointed out that this relay optical system 10' or 39 produces a very flat field by balancing the Petzval sums of the lens and mirror simultaneously providing a substantially zero distortion, coma and lateral color, at unit magnification. Other image aberrations such as astigmatism and general chromatism are reduced to an amount less than the Rayleigh limit.

Constructional data related to one successful form of the present invention are given in the table of mathematical expression herebelow and are shown in the optical diagram of FIG. 5 of the drawing. In the table, values are given for the radii $R_1$, $R_2$ and $-R_3$ of the successive lens surfaces of lens 40, and of the concave surface which is designated $-R_m$ of the mirror 42, the lens thicknesses being designated $t_1$ and $t_2$ for the negative and positive lens elements $40_n$ and $40_p$ respectively of lens 40, $n_D$ and $\sqrt{}$ represent the refractive index and Abbe number of the glasses from which the elements $40_n$ and $40_p$ are made, D represents the axial distance between lens 40 and mirror 42, and $D_1$ represents the back focus, the minus ($-$) sign denoting those curved surfaces which have their centers of curvature located on the entrant side of the apex of said surfaces:

$.687F < R_1 < .759F$
$.2445F < R_2 < .2685F$
$.958F < -R_3 < 1.058F$
$1.329F < -R_m < 1.467F$
$.0127F < t_1 < .0139F$
$.01576F < t_2 < .01614F$
$.838F < D < 1.036F$
$.2626F < D_1 < .2902F$ wherein F represents the focal length of the combined relay system 39:

$1.600 < n_D$ (Lens $40_n$) $< 1.610$
$1.512 < n_D$ (Lens $40_p$) $< 1.522$
$35.0 < \sqrt{}$ (Lens $40_n$) $< 42.0$
$60.0 < \sqrt{}$ (Lens $40_p$) $< 70.0$ wherein the numerals represent absolute values.

With respect to projection objective 46 shown in FIG. 5 of the drawing, in order to make the projector more practically useful, the aforementioned projection objective 46 is provided in a plurality of magnifications for selective use, all of which are of similar optical form.

The constructional data or parameters therefor are given herebelow in the table of ranges of values for said parameters wherein $R_4$ to $-R_{12}$ represent the radii of the successive lens surfaces numbering from the entrant side thereof, the minus ($-$) signs used therewith applying to those surfaces having their centers of curvature located on the entrant side of the vertex of such surfaces, $t_4$ to $t_7$ representing the individual axial lens thicknesses, and $D_2$ to $D_6$ representing the axial lens spacings:

$1.170F < R_4 < 1.750F$
$.290F < R_5 < .310F$
$.790F < -R_6 < .860F$
$.540F < R_7 < .590F$
$7.50F < -R_8 < 7.75F$
$.240F < -R_9 < .270F$
$.620F < R_{10} < .700F$
$1.100F < R_{11} < 2.410F$
$.250F < -R_{12} < .290F$
$.090F < t_3 < .120F$
$.020F < t_4 < .043F$
$.029F < t_5 < .063F$
$.012F < t_6 < .042F$
$.046F < t_7 < .070F$
$.030F < D_2 < .150F$
$.800F < D_3 < .840F$
$.080F < D_4 < .110F$
$.0045F < D_5 < .027F$
$19.0F < D_6 < 100.0F$

More specifically, the values of the optical parameters of the objectives 46 are given with respect to the magnification 10×, 20×, 25×, 31¼×, 50× and 62½× in the table herebelow wherein the designations of R values, $t$ values, and the D values have the same meaning as heretofore and additionally the refractive index $n_D$ and Abbe number $\sqrt{}$ for the lens materials are given, wherein F′ designates the focal length of the objective 46.

| Optical Parameter | Magnification | | | | | |
|---|---|---|---|---|---|---|
| | 10× | 20× | 25× | 31¼× | 50× | 62½× |
| $R_4$ | 1.71F′ | 1.315F′ | 1.306F′ | 1.192F′ | 1.224F′ | 1.223F′ |
| $-R_5$ | .2955F′ | .2936F′ | .293F′ | .300F′ | .2973F′ | .2975F′ |
| $-R_6$ | .806F′ | .802F′ | .800F′ | .851F′ | .796F′ | .798F′ |
| $R_7$ | .581F′ | .574F′ | .556F′ | .575F′ | .574F′ | .574F′ |
| $-R_8$ | 7.71F′ | 7.60F′ | 7.67F′ | 7.720F′ | 7.690F′ | 7.730F′ |
| $-R_9$ | .2515F′ | .250F′ | .250F′ | .250F′ | .259F′ | .261F′ |
| $R_{10}$ | .692F′ | .686F′ | .686F′ | .688F′ | .641F′ | .639F′ |
| $R_{11}$ | 2.394F′ | 2.395F′ | 2.390F′ | 2.405F′ | 1.125F′ | 1.122F′ |
| $-R_{12}$ | .2575F′ | .2554F′ | .256F′ | .256F′ | .2862F′ | .286F′ |
| $t_3$ | .0967F′ | .0959F′ | .1003F′ | .106F′ | .117F′ | .117F′ |
| $t_4$ | .0405F′ | .0213F′ | .0427F′ | .0425F′ | .0418F′ | .0416F′ |
| $t_5$ | .0294F′ | .0293F′ | .0321F′ | .0318F′ | .0629F′ | .0626F′ |
| $t_6$ | .01298F′ | .01276F′ | .0235F′ | .0212F′ | .0418F′ | .0416F′ |
| $t_7$ | .0469F′ | .0466F′ | .0492F′ | .0504F′ | .0691F′ | .0693F′ |
| $D_2$ | .1463F′ | .0754F′ | .0683F′ | .0500F′ | .0432F′ | .0344F′ |
| $D_3$ | .825F′ | .831F′ | .810F′ | .802F′ | .818F′ | .816F′ |
| $D_4$ | .104F′ | .1035F′ | .1043F′ | .106F′ | .0837F′ | .0834F′ |
| $D_5$ | .0239F′ | .0261F′ | .0235F′ | .0238F′ | .00530F′ | .00499F′ |
| $D_6$ | 99.1F′ | 19.78F′ | 24.760F′ | 31.100F′ | 49.97F′ | 62.30F′ |

Wherein the minus ($-$) sign has the same meaning as explained in the preceding table.

For magnifications 10×, 20×, 25×, 31¼×, 50× and 62½×:

$n_D(I) = 1.620$
$n_D(II) = 1.649$
$n_D(III) = 1.611$
$n_D(IV) = 1.580$
$n_D(V) = 1.611$
$\sqrt{}(I) = 59.8$
$\sqrt{}(II) = 33.8$
$\sqrt{}(III) = 57.2$
$\sqrt{}(IV) = 41.0$
$\sqrt{}(V) = 57.2$ wherein the numerals in the table represent absolute values.

Although only certain forms of the invention have been shown and described, other forms are possible and changes may be made in the arrangement and details of the parts thereof without departing from the spirit of the invention as defined in the claims here appended.

I claim:

1. In an afocal and telecentric catadioptric optical system for contour projectors and the like including a positive lens and a confronting spherical mirror which is concave thereto and is spaced therefrom at the focal length of said lens, said lens aperture being functionally divided into two equal and symmetrical parts, an object located forwardly of and within the depth of focus of one of said aperture parts so that the image rays in object space which are refracted by that one part are projected upon the center of said mirror and are reflected therefrom through the other of said parts of the lens to form an image at a position which is in conjugate to the object position, and means for illuminating said object episcopically, said means having in combination a light source and a condenser lens therefor arranged on a common axis which intersects the approximate center of said mirror and is positioned rearwardly thereof, the mirror being smaller than said condenser lens and partially occluding light which is transmitted therethrough, the illumination rays being directed along said common axis which is inclined to the axis of the catadioptric system and intersects the center portion of the first-mentioned part of the lens so that said rays are projected toward and upon said object.

2. In an afocal and telecentric catadioptric optical system for contour projectors and the like including a positive lens and a confronting spherical mirror which is concave thereto and is spaced therefrom at the focal length of said lens, said lens aperture being functionally divided into two equal and symmetrical parts, an object located forwardly of and within the depth of focus of one of said aperture parts so that the image rays in object space which are refracted by that one part are projected upon the center of said mirror and are reflected therefrom through the other of said parts of the lens to form an image at a position which is conjugate to the object position, the combination of a plane and opaque reflecting surface and means for holding said surface obliquely to and facing the front surface of said lens so as to direct the retrodirected rays coming therefrom in a direction substantially normal to the lens axis, one edge of said surface extending straight across the semi-diameter of said lens and overlaying half of the lens aperture so as to diaphragm the object rays, an upright projection screen, and means for projecting said image upon said screen with magnification.

3. A catadioptric afocal and telecentric optical system comprising a compound positive lens which is optically aligned on an axis with a spherical concave mirror, the axial distance D between the lens and the mirror being equal to the focal length of said lens, diaphragm means located adjacent to said lens including two similar and symmetrical boundary walls defining two apertures in the diaphragm, an object located forwardly of said lens within its depth of focus and aligned with one of said apertures, the image of said object being formed conjugate to said object in line with the other of said apertures so that the image rays coming through the first said aperture are converged upon the mirror and are diverged therefrom through the second-mentioned aperture, the back focal length from said lens to said image being designated $D_1$, the constructional data for said optical system being given in ranges of values in the table herebelow wherein $R_1$ to $R_3$ represent the radii of the successive refractive surfaces of the lens which is composed of a front negative element $n$ and a rear positive element $p$, numbering in the direction of incident light, the minus (—) sign used with the R symbols applying to those lens surfaces which have their centers of curvature located on the entrant side of the vertex of the surfaces, the radius of said concave mirror surface being designated $-R_m$, the axial thicknesses $t_1$ and $t_2$ being related to the negative and positive lens elements respectively, and F representing the equivalent focal length of said optical system:

$.687F<R_1<.759F$
$.2445F<R_2<.2685F$
$.958F<-R_3<1.058F$
$1.329F<-R_m<1.467F$
$.0127F<t_1<.0139F$
$.01576F<t_2<.01614F$
$.838F<D<1.036F$
$.2626F<D_1<.2902F$ the refractive index $n_D$ and the Abbe number $\sqrt{}$ for said negative and positive lens elements having values as stated by the mathematical expressions in the table herebelow:

$1.600<n_D(n)<1.610$
$1.512<n_D(p)<1.522$
$35.0<\sqrt{}(n)<42.0$
$60.0<\sqrt{}(p)<70.0$ wherein the numerals in the table represent absolute values.

4. A catadioptric afocal and telecentric optical system comprising a compound positive lens which is optically aligned on an axis with a spherical concave mirror, the axial distance D between the lens and the mirror being equal to the focal length of said lens, diaphragm means located adjacent to said lens including two similar and symmetrical boundary walls defining two apertures in the diaphragm, an object located forwardly of said lens within its depth of focus and aligned with one of said apertures, the image of said object being formed conjugate to said object in line with the other of said apertures so that the image rays coming through the first said aperture are converged upon the mirror and are diverged therefrom through the second-mentioned aperture, the back focal length from said lens to said image being designated $D_1$, the values of the constructional data for the optical system being given in the table herebelow wherein $R_1$ to $R_3$ represent the radii of the successive refractive surfaces of the lens which is composed of a front negative element $n$ and a rear positive element $p$, numbering in the direction of incident light, the minus (—) sign used with the R symbols applying to those lens surfaces which have their centers of curvature located on the entrant side of the vertex of the surfaces, the radius of said concave mirror surface being designated $-R_m$, the axial thicknesses $t_1$ and $t_2$ being related to the negative and positive lens elements respectively, and F representing the equivalent focal length of said optical system:

$R_1=.723F$
$R_2=.2565F$
$-R_3=1.008F$
$-R_m=1.398F$
$t_1=.0133F$
$t_2=.01595F$
$D=.987F$
$D_1=.276F$ the refractive index $n_D$ and the Abbe number $\sqrt{}$ for said negative and positive lens elements having values as stated by the mathematic expressions in the table herebelow:

$n_D(n) = 1.605$
$n_D(p) = 1.517$
$(n) = 38.0$
$(p) = 64.5$ wherein the numerals in the table represent absolute values.

5. In an optical comparator or the like including a projection screen on which reference indicia are formed and whereon an enlarged image of an object is projected for comparison therewith, said comparator further including a catadioptric afocal and telecentric optical system comprising a compound positive lens which is optically aligned on an axis with a spherical concave mirror, the axial distance D between the lens and the mirror being equal to the focal length of said lens, diaphragm means located adjacent to said lens including two similar and symmetrical boundary walls defining two apertures in the diaphragm, an object located forwardly of said lens within its depth of focus and aligned with one of said apertures, the image of said object being formed conjugate to said object in line with the other of said apertures so that the image rays coming through the first said aperture are converged upon the mirror and are diverged therefrom through the second-mentioned aperture, the back focal length from said lens to said image being designated $D_1$, the constructional data for said optical system being given in ranges of values in the table herebelow wherein $R_1$ to $R_3$ represent the radii of the successive refractive surfaces of the lens which is composed of a front negative element and a rear positive element P, numbering in the direction of incident light, the minus (—) sign used with the R symbols applying to those lens surfaces which have their centers of curvature located on the entrant side of the vertex of the surfaces, the radius of said concave mirror surface being designated $-R_m$, the axial thicknesses $t_1$ and $t_2$ being related to the negative and positive lens elements respectively, and F representing the equivalent focal length of said optical system:

$.687F < R_1 < .759F$
$.2445F < R_2 < .2685F$
$.958F < -R_3 < 1.058F$
$1.329F < -R_m < 1.467F$
$.0127F < t_1 < .0139F$
$.01576F < t_2 < .01614F$
$.838F < D < 1.036F$
$.2626F < D_1 < .2902F$ the refractive index $n_D$ and the Abbe number $\sqrt{}$ for said negative and positive lens elements having values as stated by the mathematical expressions in the table herebelow:

$1.600 < n_D(n) < 1.610$
$1.512 < n_D(p) < 1.522$
$35.0 < \sqrt{}(n) < 42.0$
$60.0 < \sqrt{}(p) < 70.0$ wherein the numerals in the table represent absolute values, said comparator further including a projection objective which is optically aligned with said image and is arranged to form an enlarged image thereof on said screen, said objective comprising a front doublet composed of a double convex lens element I which is in contact with a rear negative meniscus lens element II, the axial thicknesses of which are designated respectively $t_3$ and $t_4$, and further composed of a pair of double convex lens elements III and V between which is spaced a double concave lens element IV, the axial thicknesses of elements III, IV and V being respectively $t_5$, $t_6$ and $t_7$, the air spaces between elements II and III, between elements III and IV, and between elements IV and V being respectively $D_3$, $D_4$ and $D_5$, and the back focus distance from said objective to said screen being designated $D_6$, the successive lens radii of lenses I to V being designated $R_4$ to $R_{12}$, the numerical values of the above-mentioned optical parameters of said lenses being stated in the table of mathematical expressions herebelow:

$1.170F < R_4 < 1.750F$
$.290F < -R_5 < .310F$
$.790F < -R_6 < .860F$
$.540F < R_7 < .590F$
$7.50F < -R_8 < 7.75F$
$.240F < -R_9 < .270F$
$.620F < R_{10} < .700F$
$1.100F < R_{11} < 2.410F$
$.250F < -R_{12} < .290F$
$.090F < t_3 < .120F$
$.020F < t_4 < .043F$
$.029F < t_5 < .063F$
$.012F < t_6 < .042F$
$.046F < t_7 < .070M$
$.030F < D_2 < .150F$
$.800F < D_3 < .840F$
$.080F < D_4 < .110F$
$.0045F < D_5 < .027F$
$19.0F < D_6 < 100.0F$

6. An optical comparator as set forth in claim 5 wherein the specific values of the optical parameters within the ranges given are substantially as stated in the chart herebelow together with the values for the refractive index $n_D$ and Abbe number $\sqrt{}$ of the glasses from which said lens elements are made,

| Optical Parameter | Magnification | | | | | |
|---|---|---|---|---|---|---|
| | 10× | 20× | 25× | 31¼× | 50× | 62½× |
| $R_4$ | 1.71F' | 1.315F' | 1.306F' | 1.192F' | 1.224F' | 1.223F' |
| $-R_5$ | .2955F' | .2936F' | .293F' | .300F' | .2973F' | .2975F' |
| $-R_6$ | .806F' | .802F' | .800F' | .851F' | .796F' | .798F' |
| $R_7$ | .581F' | .574F' | .556F' | .575F' | .574F' | .574F' |
| $-R_8$ | 7.71F' | 7.60F' | 7.67F' | 7.720F' | 7.690F' | 7.730F' |
| $-R_9$ | .2515F' | .250F' | .250F' | .250F' | .259F' | .261F' |
| $R_{10}$ | .692F' | .686F' | .686F' | .688F' | .641F' | .639F' |
| $R_{11}$ | 2.394F' | 2.395F' | 2.390F' | 2.405F' | 1.125F' | 1.122F' |
| $-R_{12}$ | .2575F' | .2554F' | .256F' | .256F' | .2862F' | .286F' |
| $t_3$ | .0967F' | .0959F' | .1003F' | .106F' | .117F' | .117F' |
| $t_4$ | .0405F' | .0213F' | .0427F' | .0425F' | .0418F' | .0416F' |
| $t_5$ | .0294F' | .0293F' | .0321F' | .0318F' | .0629F' | .0626F' |
| $t_6$ | .01298F' | .01276F' | .0235F' | .0212F' | .0418F' | .0416F' |
| $t_7$ | .0469F' | .0466F' | .0492F' | .0504F' | .0691F' | .0693F' |
| $D_2$ | .1463F' | .0754F' | .0683F' | .0500F' | .0432F' | .0344F' |
| $D_3$ | .825F' | .831F' | .801F' | .802F' | .818F' | .816F' |
| $D_4$ | .104F' | .1035F' | .1043F' | .106F' | .0837F' | .0834F' |
| $D_5$ | .0239F' | .0261F' | .0235F' | .0238F' | .00530F' | .00499F' |
| $D_6$ | 99.1F' | 19.78F' | 24.760F' | 31.100F' | 49.97F' | 62.30F' |

Wherein the minus (—) sign has the same meaning as explained in claim 5.

For magnifications 10×, 20×, 25×, 31¼×, 50× and 62½×:

$n_D(I) = 1.620$
$n_D(II) = 1.649$
$n_D(III) = 1.611$
$n_D(IV) = 1.580$
$n_D(V) = 1.611$
$\sqrt{}(I) = 59.8$
$\sqrt{}(II) = 33.8$
$\sqrt{}(III) = 57.2$
$\sqrt{}(IV) = 41.0$
$\sqrt{}(V) = 57.2$ wherein the numerals in the table represent absolute values.

References Cited by the Examiner

UNITED STATES PATENTS

| | | |
|---|---|---|
| 1,783,998 | 12/1930 | Chretien. |
| 2,552,280 | 5/1951 | Hudak _____ 88—24 |
| 2,663,012 | 12/1953 | Beers _____ 88—57 X |
| 2,742,817 | 4/1956 | Altman _____ 88—57 |
| 2,817,270 | 12/1957 | Mandler _____ 88—57 |
| 3,115,537 | 12/1963 | Bird _____ 88—57 |

NORTON ANSHER, *Primary Examiner.*